No. 669,095. Patented Mar. 5, 1901.
J. H. MITCHELL.
DIFFERENTIAL GEARING.
(Application filed June 27, 1900.)
(No Model.) 2 Sheets—Sheet 1.
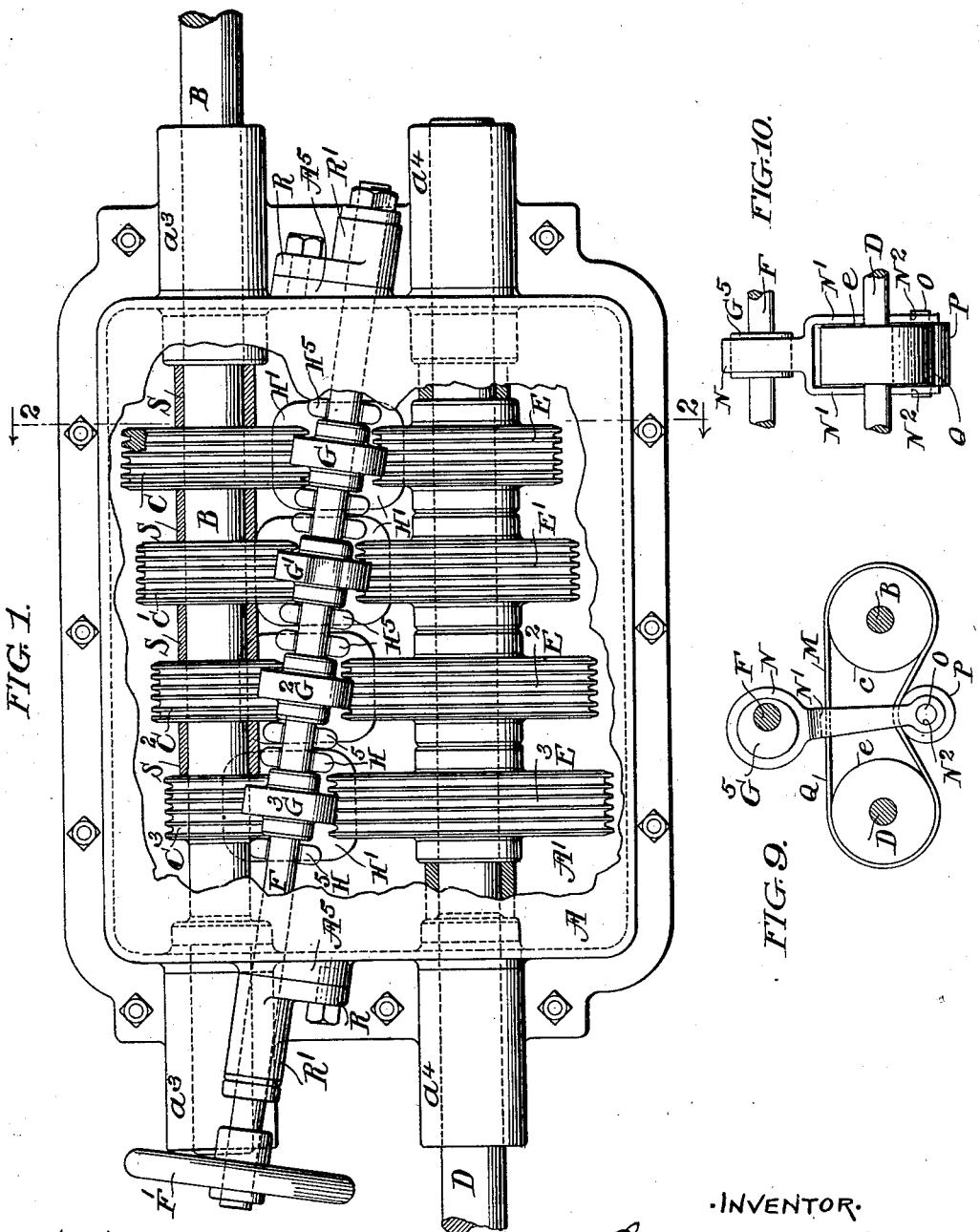
WITNESSES·
·INVENTOR·

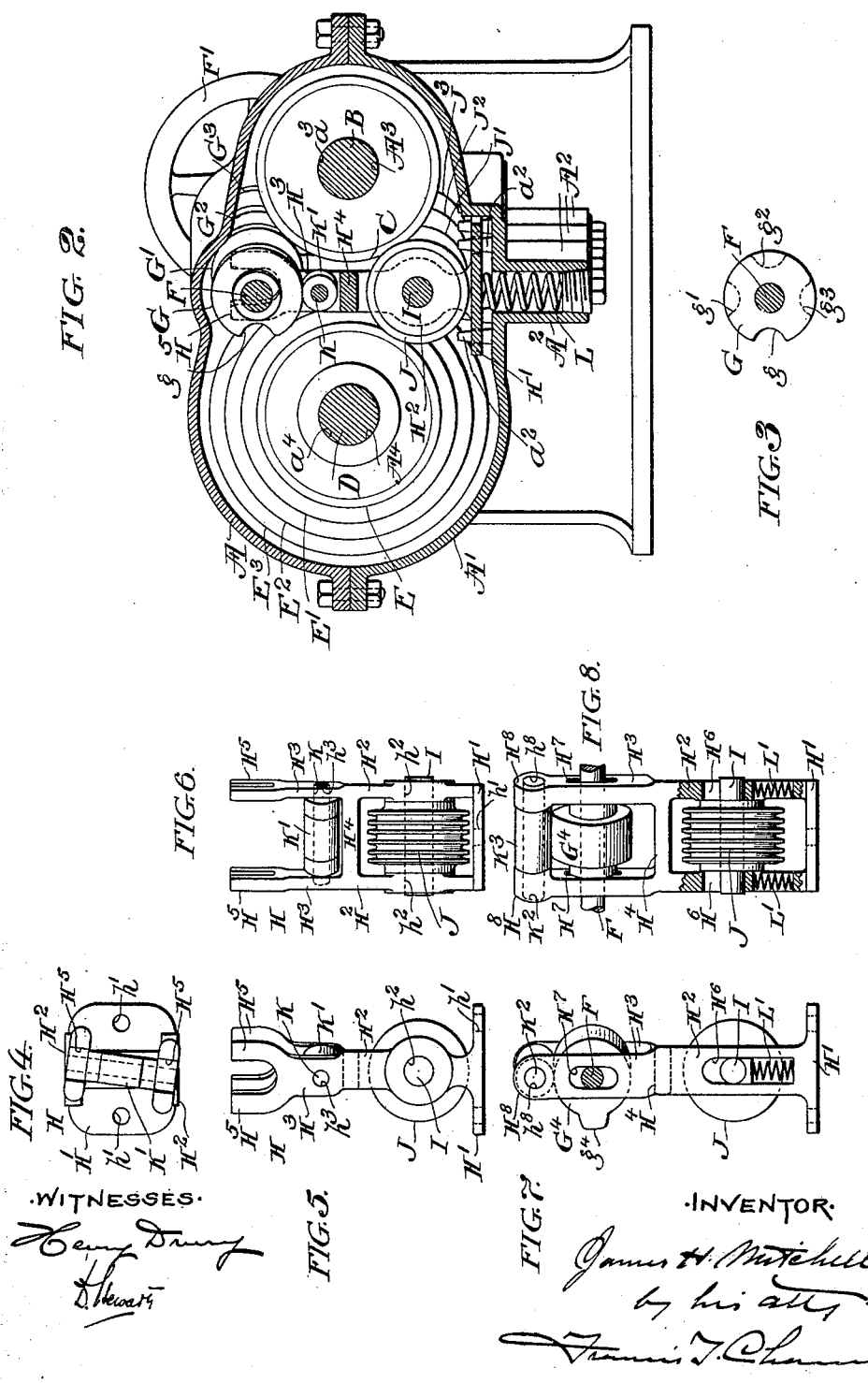

UNITED STATES PATENT OFFICE.

JAMES H. MITCHELL, OF PHILADELPHIA, PENNSYLVANIA.

DIFFERENTIAL GEARING.

SPECIFICATION forming part of Letters Patent No. 669,095, dated March 5, 1901.

Application filed June 27, 1900. Serial No. 21,734. (No model.)

*To all whom it may concern:*

Be it known that I, JAMES H. MITCHELL, a citizen of the United States of America, residing in the city and county of Philadelphia, in the State of Pennsylvania, have invented a certain new and useful Improvement in Differential Gearing, of which the following is a true and exact description, reference being had to the accompanying drawings, which form a part thereof.

My invention relates to mechanism for transmitting rotary motion with varying speeds, and has for its object to provide a device for this purpose of simple and efficient construction and one which is easily and rapidly operated.

The nature of my improvements will be best understood as described in connection with the drawings, in which they are illustrated, and in which—

Figure 1 is a plan view of my device in its best form with the top of the casing broken away to show the internal mechanism. Fig. 2 is a cross-section on the line 2 2 of Fig. 1. Fig. 3 is an end view of the cam-shaft, showing the arrangement of cams thereon. Fig. 4 is a plan view of the yoke holding the intermediate gear-wheel. Fig. 5 is a side view, and Fig. 6 a front view, of said yoke. Fig. 7 is a side view of a modified form of yoke, and Fig. 8 a front view of the same yoke. Fig. 9 is a diagram showing in elevation a modification of my invention, and Fig. 10 is an end view of the modification shown in Fig. 9.

A and A' indicate the two parts of the casing in which my mechanism is preferably inclosed.

$A^2 A^2$, &c., indicate a series of pockets formed in the under side of the lower section A' and closed, as shown, by screw-plugs, $a^2 a^2$ indicating guiding-pins projecting upward from the casing-section A' on each side of the pockets $A^2$.

$a^3 a^3$ indicate the bearings formed in the casing for the shaft B. $a^4 a^4$ indicate the similar bearings formed in the casing for the shaft D.

$A^5 A^5$, Fig. 1, indicate projections from the face of the upper section of the casing, through which are formed perforations for the ends of the cam-shafts F and against which are bolted the plates R, supporting the bearings R' R' of said cam-shaft.

B indicates the power-shaft, to which is secured a series of power-transmitting wheels, preferably friction-wheels, as shown at C, C', $C^2$, and $C^3$. These wheels are of varying diameter, and, as shown, the wheel $C^3$ is forged integral with the shaft and the other larger wheels keyed thereto and spaced, as by means of sleeves, (indicated at S.)

D indicates the shaft to which motion is to be communicated from the shaft B, and to it are keyed the friction-wheels indicated at E, E', $E^2$, and $E^3$, said wheels being preferably arranged, as shown, so that the smaller one corresponds with and forms a pair, together with the larger ones on the shaft B.

F is a cam-shaft extending through the casing and having secured to it, as shown in Figs. 1, 2, and 3, a series of cams, (indicated at G, G', $G^2$, and $G^3$,) one being provided for each pair of wheels on the shafts B and D. These cams, as shown, are of circular outline with a recessed portion, as indicated at $g$, $g'$, $g^2$, and $g^3$, (see Fig. 3,) the recesses in the various cams being arranged in different angular positions and preferably at ninety degrees apart, as shown.

H, Figs. 1, 2, 4, 5, and 6, indicates what I call a "yoke-piece" for supporting the intermediate wheels of the system. In its preferred form it is made with a flat base (indicated at H') and having perforations $h'$ formed in it to receive the guide-pins $a^2$. Above the base-plate H' rise the two standards $H^2 H^2$, having formed in them bearings (indicated at $h^2$) to receive the shaft or axis, (indicated at I,) with which or upon which turns the intermediate friction-wheel J or J' $J^2 J^3$. The standards $H^2$ are preferably connected together over the space occupied by the intermediate wheel, as by a cross-bar $H^4$, and are continued from it at a somewhat different angle, as indicated at $H^3$, this continuation being perforated, as indicated at $h^3$, to receive the pin K, supporting the cam-roller K'. The angularly-divergent continuations $H^3$ of the standards are further continued in the form of yoke-pieces, as indicated at $H^5$. One of the yoke-pieces $H^5$ is placed over each of the pockets $A^2$, guide-pins $a^2$ extending through its perforations $h'$ and its base $H'$ resting on a spring L, supported in the pocket $A^2$. The yoke-pieces $H^5$ are placed so as to grasp the cam-shaft F on each side of the corresponding cam G G', &c., and the action of the spring L is to bring the roll K' into contact with the face of the cam, the larger diameter of which is sufficient, as indicated in Fig. 2, to hold the intermediate wheel J out of contact with the wheels on the shafts B and D, while the cam-recess $g$ $g'$, &c., is sufficiently deep to insure that the thrust of the spring L will force the yoke-piece upward and bring the intermediate roll into operative connection with the wheels E and C when the cam portion $g$ comes into registry with the roller K'. The reason for continuing the portion $H^3$ of the standards $H^2$ is the obvious one that in my preferred form of construction the cam-shaft F runs at an angle to the parallel shafts B and D.

F' indicates a hand-wheel on the end of the cam-shaft, by which it can be turned, and obviously in the construction shown I have put into contact one and the only one of the intermediate wheels which will be in operative contact with its corresponding pair of wheels on the shafts B and D at one time, while each intermediate wheel will be thrown into such operative connection during each complete revolution of the cam-shaft.

The great ease and facility with which the speed of the transmitted rotary power can be changed by my device is obvious, as is also the practical advantage of inclosing the mechanism in a casing, as shown, which should for the best results be filled or partially filled with oil.

My invention is capable of being embodied in many modifications of form and construction without departure from its spirit and essence. Thus a very simple modification is illustrated in Figs. 7 and 8, where only the cam is made to act positively instead of permissibly upon the motion of the yoke, while the desirable though not in all cases essential resilient pressure of the intermediate wheel against its connected wheels is provided for by means of the springs supported on the yoke-piece and supporting in turn the shaft I. In this construction the standards $H^2$ are formed with slits, as indicated at $H^6$, in which the ends of the shafts I are placed, as are also springs, as indicated at L'. The continuations $H^3$ of the standards are also formed with slits, as indicated at $H^7$, the cam-shaft passing through said slits and supporting-cams, as indicated at $G^4$ $g^4$. In the space between the standards are cam-rolls, as indicated at $K^3$, being supported on pins $K^2$, supported in turn in perforations $h^8$ in the upper portions $H^8$ of the standards. It will be obvious that in using this modification the cam $G^4$ will once in each revolution act upon and thrust upward the yoke, bringing the intermediate wheel J into contact with the pair of wheels with which it connects and with resilient pressure provided for by means of the springs L'.

In the modification illustrated diagrammatically in Figs. 9 and 10 I have shown the application of my invention to constructions in which the differential wheels connected with the shafts B and D are belt-wheels, as indicated at $e$ and $c$, and connected by belts, (indicated at Q,) said belts being normally loose, but capable of being tightened by the action of tightening-pulleys, such as is indicated at P. The pulley P runs on a pin O, supported in perforations $N^2$ of a yoke N', the upper portion of which is connected to an eccentric-strap N, surrounding an eccentric $G^5$, secured on the shaft F. The eccentric is of course the full equivalent for the cams and the action of the device is, broadly speaking, identical with those already described.

Having now described my invention, what I claim as new, and desire to secure by Letters Patent, is—

1. A device for transmitting rotary motion with varying speeds consisting of two shafts in combination with power-transmitting wheels of different diameters arranged in pairs one member of each pair secured on each shaft, a series of independently-adjustable connecting devices, each arranged to couple a pair of said wheels when forced into operative position, a series of cams, arranged to act on each connecting device and all adapted to move as described so as to force each connecting device in turn into operative position, and means for moving said cams at will.

2. A device for transmitting rotary motion with varying speeds consisting of two shafts in combination with power-transmitting wheels of different diameters arranged in pairs one member of each pair secured on each shaft, a series of independently-adjustable connecting devices, each arranged to couple a pair of said wheels when forced into operative position, a shaft, as F, and a series of cams secured to said shaft, arranged to act on each connecting device and all adapted to move as described so as to force each connecting device in turn into operative position.

3. A device for transmitting rotary motion with varying speeds consisting of two shafts in combination with power-transmitting wheels of different diameters, arranged in pairs, one member of each pair secured on each shaft, a series of independently-adjustable intermediate wheels, each arranged to couple one of said pairs of wheels when forced into operative position, a cam-shaft and a series of cams secured to said shaft and adapted to force each intermediate wheel into operation in turn.

4. A device for transmitting rotary motion with varying speeds consisting of two shafts in combination with power-transmitting wheels of different diameters arranged in a series of pairs, one wheel of each pair secured to each shaft, a series of independently-adjustable intermediate wheels one of which is adapted to couple each pair of power-transmitting wheels, a cam-shaft, a series of cams secured thereto and each adapted to act upon one of the intermediate wheels as described, and a casing inclosing and forming an oil-chamber about said mechanism.

5. A device for transmitting rotary motion with varying speeds consisting of two shafts in combination with power-transmitting friction-wheels of different diameters arranged in a series of pairs, one wheel of each pair secured to each shaft, a series of independently-adjustable intermediate friction-wheels, one of which is adapted to couple each pair of power-transmitting wheels, a cam-shaft, a series of cams secured thereto and each adapted to act upon one of the intermediate wheels as described, and a casing inclosing and forming an oil-chamber about said mechanism.

6. A device for transmitting rotary motion with varying speeds consisting of two shafts in combination with power-transmitting wheels of different diameters arranged in a series of pairs, one wheel of each pair secured to each shaft, a cam-shaft, a series of cams secured thereto, a series of wheel-holding yokes acted on by said cams, and a series of intermediate wheels one secured in each yoke and each adapted to couple one pair of power-transmitting wheels when its yoke is in determined position.

7. A device for transmitting rotary motion with varying speeds consisting of two shafts in combination with power-transmitting wheels of different diameters arranged in a series of pairs, one wheel of each pair secured to each shaft, a cam-shaft, a series of cams secured thereto, a series of self-adjusting wheel-holding yokes acted on by said cams, and a series of intermediate wheels one secured in each yoke and each adapted to couple one pair of power-transmitting wheels when its yoke is in determined position.

8. A device for transmitting rotary motion with varying speeds consisting of two shafts in combination with power-transmitting wheels of different diameters arranged in a series of pairs, one wheel of each pair secured to each shaft, a cam-shaft, a series of cams secured thereto, a series of wheel-holding yokes acted on by said cams, a series of springs acting on said yokes to move them to operative position, and a series of intermediate wheels one secured in each yoke and each adapted to couple one pair of power-transmitting wheels when its yoke is in determined position.

JAMES H. MITCHELL.

Witnesses:
CHAS. F. MYERS,
D. STEWART.